Nov. 19, 1957 T. J. HERRMANN 2,813,733
TURNBUCKLE
Filed April 24, 1956
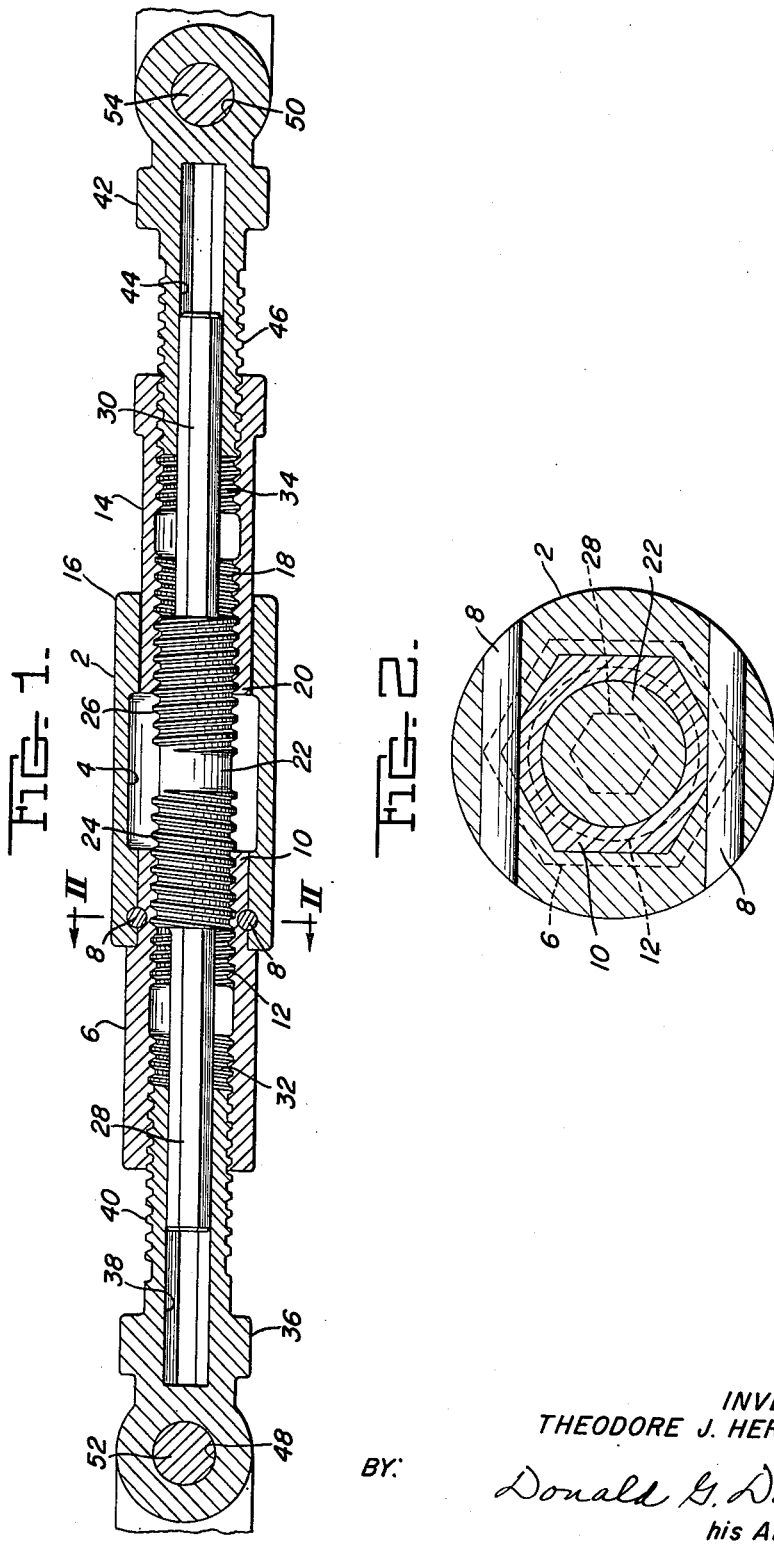
INVENTOR:
THEODORE J. HERRMANN,
BY: Donald G. Dalton
his Attorney.

United States Patent Office 2,813,733
Patented Nov. 19, 1957

2,813,733
TURNBUCKLE

Theodore J. Herrmann, McKeesport, Pa., assignor to United States Steel Corporation, a corporation of New Jersey Application April 24, 1956, Serial No. 580,308

6 Claims. (Cl. 287—60)

The present invention relates to turnbuckles and has as its primary object the provision of an improved turnbuckle having a unique structural arrangement whereby the effect of its operation is doubled over that of conventional turnbuckles.

Prior to my invention conventional turnbuckle structure consisted essentially of an internally threaded tubular body or sleeve having a screw threaded into each end thereof. The threads in each end of the sleeve were of opposite hand so that one revolution of the sleeve caused the screws to move one thread lead. Thus, if the sleeve was rotated one revolution in one direction the screws would move toward each other by two thread leads and the reverse being true when the sleeve was rotated in the opposite direction. In certain industrial operations turnbuckles must be used in lines supporting a ramp or platform so that the level of the ramp or platform may be changed periodically during various stages of processing. In such operations, the time required to rotate the turnbuckles has had the effect of slowing down production. I propose to minimize this detrimental effect by providing a quick-acting turnbuckle made up of a number of threaded cooperating components combined in a unique structural arrangement whereby a single turn of the turnbuckle shortens or lengthens the distance between its extremities by double the amount heretofore possible.

The invention will be fully apparent from the following detailed disclosure and the drawings in which:

Figure 1 is a longitudinal sectional view; and

Figure 2 is a cross-sectional view taken on the line II—II of Figure 1.

Referring more particularly to the drawings reference numeral 2 designates a tubular body or sleeve having a center bore 4 the ends of which are hexagonal in cross-section. The body 2 is provided with an extension 6 projecting from one end thereof. The extension 6 has a hexagonal configuration which matches and cooperates with the bore of the body 2 in which it is fixed by means of pins 8. Although I have shown the extension as a separate component of the body 2, it may be constructed with extension 6 integral therewith. The inner end 10 of the extension 6 is internally threaded so as to provide an intermediate threaded portion 12 of reduced diameter in the body 2.

An elongated hexagonal nut 14 is slidably fitted into the end 16 of the tubular body 2 opposite the end thereof into which the extension 6 is fitted. The hexagonal configuration of nut 14 which cooperates with the bore 4 renders it non-rotatable relative to body 2 but permits it to move axially therein. An internally threaded portion 18 is provided in the nut 14 adjacent its inner end 20. The diameter of portion 18 is equal to the diameter of portion 12. A screw shaft 22 having threaded portions 24 and 26 of opposite hand is disposed in the body 2 with the threaded portion 24 threadingly engaged in the internally threaded portion 12 of body 2 and its threaded portion 26 threadingly engaged by the threaded portion 18 of nut 14. Threaded portions 12 and 24 have matching left hand threads while threaded portions 18 and 26 have matching right hand threads. Non-threaded portions 28 and 30, which are hexagonal in cross-section, of screw shaft 22 project axially from threaded portions 24 and 26, respectively.

Extension 6 of tubular body 2 and nut 14 are provided with internally threaded portions 32 and 34, respectively, adjacent their outer ends. The thread of portion 32 is right hand and that of portion 34 is left hand.

A screw 36 having a hexagonal center bore 38 and external right hand threads 40 is threaded into the internally threaded portion 32 of the extension 6 of tubular body 2. The portion 28 of screw shaft 22 is axially slidable in the bore 38 of screw 36 but is prevented from rotating therein by its hexagonal exterior which matches and cooperates with the hexagonal bore 38.

A screw 42 having a hexagonal center bore 44 and left hand exterior threads 46 is threaded into the threaded portion 34 of nut 14 and slidably receives the portion 30 of screw shaft 22. Portion 30 of screw shaft 22 is axially slidable in bore 44 but non-rotative therein because of its hexagonal exterior which matches and cooperates with the hexagonal bore 44.

Screws 36 and 42 may be provided with eyes 48 and 50, respectively, at their outer ends for receiving connecting pins 52 and 54, respectively.

Although I have shown the use of matching hexagonal surfaces for preventing rotation of nut 14 in the bore of the tubular body 2 and for preventing rotation of the portions 28 and 30 in screws 36 and 42, it is to be understood that other means, such as a spline connection, could be used for this purpose so long as such connections prevented relative rotational movement but permitted relative axial movement.

In operation, screw 36 is fixed against rotational and axial movement while screw 42 is only restrained from rotational movement but is free to move axially in either direction. In order to shorten the distance between the outer extremities of screws 36 and 42 a wrench is applied to either the tubular body extension 6 or the elongated nut 14 and the body 2 is rotated in clockwise direction, as viewed from the left in Figure 1.

As viewed from the left in Figure 1, when the turnbuckle assembly is thus rotated in the clockwise direction body 2 advances to the left with threads 32 of extension 6 engaging threads 40 of screw 36; screw shaft 22 advances to the left in the internally threaded portion 12 of body 2 and its non-threaded portion 28 slides axially to the left in the bore 38 of screw 36; nut 14 advances to the left on the threaded portion 26 of screw shaft 22 at the same time it is moving axially to the left in tubular body 2; and screw 42 advances to the left in the threaded portion 34 of nut 14 with its center bore 44 sliding on the non-threaded portion 30 of the screw shaft 22. Thus, one revolution on the turnbuckle assembly in the clockwise direction causes the screw 42 to advance four thread leads toward the fixed screw 36. Conversely one revolution of the turnbuckle assembly will cause the screw 42 to move four thread leads away from screw 36. If desired the tubular body 2 and nut 14 of the device could both be maintained in fixed position and movement effected by turning either or both of the screws 36 and 42. In other words the turnbuckle of the invention can be operated from either end or the middle. Two or more of the devices of the invention can be coupled together by means of a connecting sleeve to multiply the mechanical advantage.

While one embodiment of my invention has been shown and described, it will be apparent that other adaptations and modifications may be made without departing from the scope of the following claims.

I claim:

1. A turnbuckle comprising a tubular body having an internally threaded intermediate portion, a nut axially slidable but non-rotatable in one end of said tubular body, a screw shaft having threaded portions of opposite hand intermediate its ends cooperating respectively with said first mentioned intermediate portion and an internally threaded portion in the inner end of said nut, said tubular body having an extension at the end thereof opposite that in which said nut is slidable, said extension and said nut having internally threaded portions adjacent their outer ends of opposite hand to the thread of said intermediate portion of said body and the internally threaded portion in the inner end of said nut, center bored screws threaded into the outer ends of said extension and said nut, said screws being axially slidable on the ends of said shaft but non-rotatable thereon, and connecting means on the outer ends of said screws.

2. A turnbuckle as defined by claim 1 including interfitting portions of non-circular section on the exterior of said nut and the interior of said tubular body.

3. A turnbuckle as defined by claim 1 including interfitting portions of non-circular section on the exterior of said screw shaft and the walls of the center bores of said screws.

4. A turnbuckle comprising a tubular body having an extension at one end, a first internally threaded portion adjacent the outer end of said extension, a second internally threaded portion in said extension adjacent the inner end thereof, a nut slidably fitted in the end of said body remote from said extension, said nut being axially slidable in said remote end but non-rotatable therein, a first internally threaded portion in said nut adjacent the inner end thereof, a second internally threaded portion in said nut adjacent the outer end thereof, the thread of each of said first portions being of the same hand, the thread of each of said second portions being of the same hand relative to each other but of the opposite hand relative to said first portions, a screw shaft having a two part externally threaded portion intermediate its ends disposed in said body, the threads on said two parts being of the opposite hand relative to each other, one of said parts being threadingly engaged by said second internally threaded portion of said tubular body, the other of said parts being threadingly engaged by said first internally threaded portion of said nut, a reduced diameter portion projecting from each end of the threaded portion of said screw shaft, a first screw having a center bore threaded into the first internally threaded portion of said tubular body, a second screw having a center bore threaded into the second internally threaded portion of said nut, said screws being axially slidable on the reduced diameter portions of said screw shaft but non-rotatable thereon, and connecting means on the outer end of each of said screws.

5. A turnbuckle as defined by claim 4 including interfitting portions of non-circular section on the exterior of said nut and on the interior of said tubular body.

6. A turnbuckle as defined by claim 4 including interfitting portions of non-circular section on the exterior of said reduced diameter portions of said screw shaft and on the interior walls of the center bores of said screws.

References Cited in the file of this patent

UNITED STATES PATENTS

| | | |
|---|---|---|
| 1,110,201 | Hardick | Sept. 8, 1914 |
| 2,420,364 | Espenas | May 13, 1947 |
| 2,678,226 | Wright | May 11, 1954 |
| 2,715,012 | Huber | Aug. 9, 1955 |